June 25, 1935.  H. ERNST ET AL  2,006,312
COMPENSATING BLEEDER VALVE
Filed Feb. 2, 1932  3 Sheets-Sheet 1
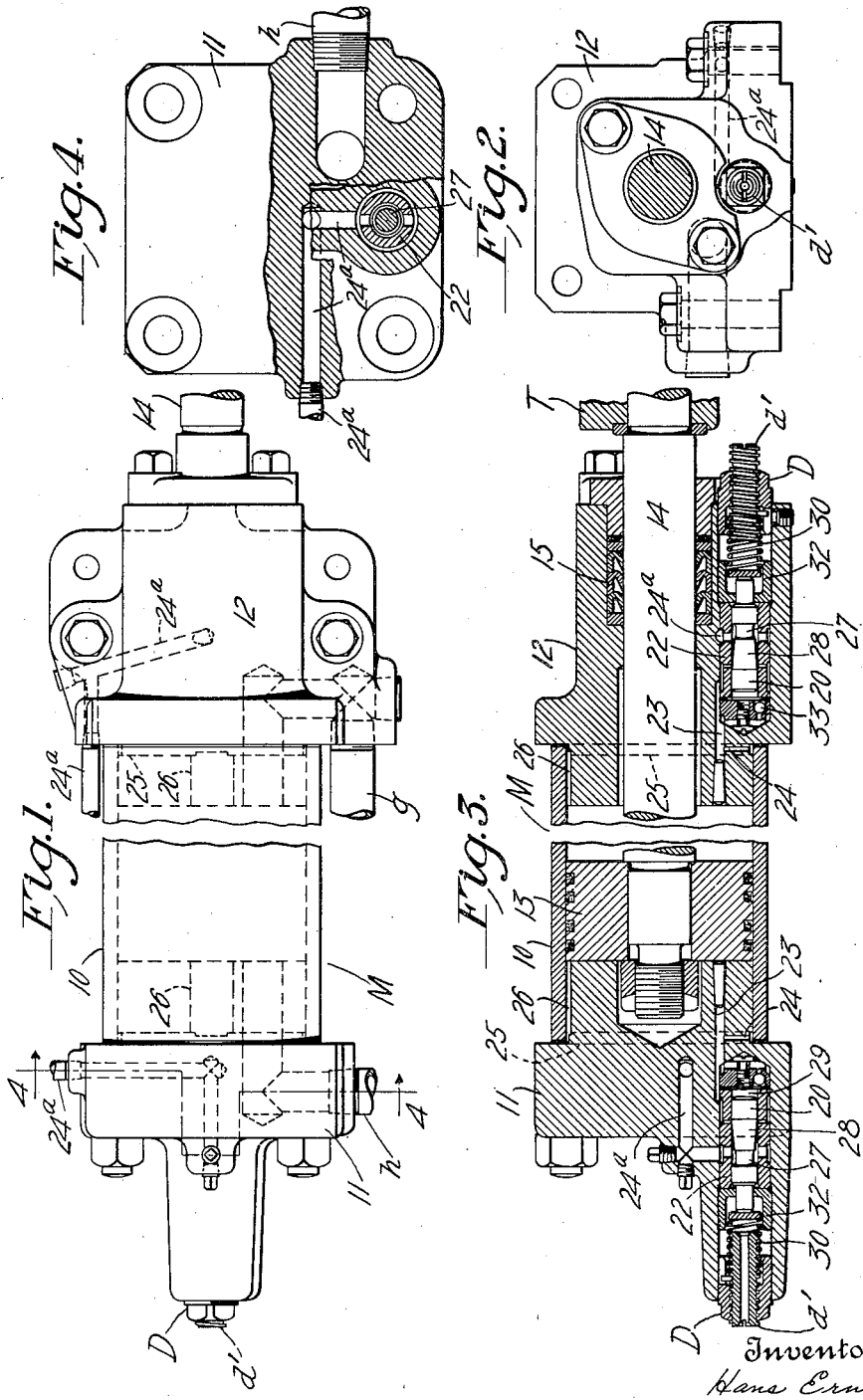

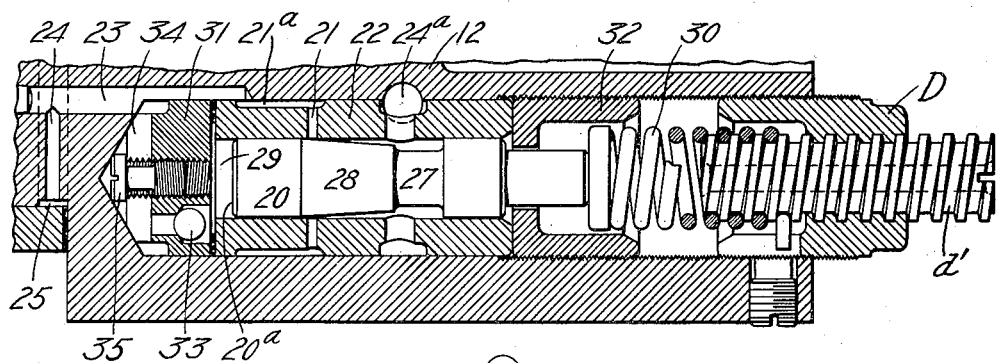
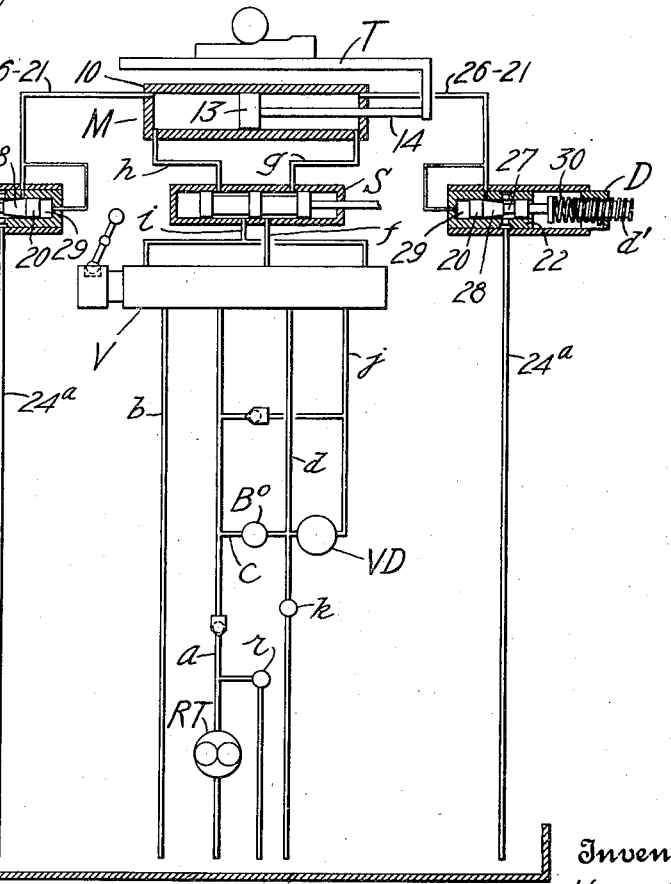

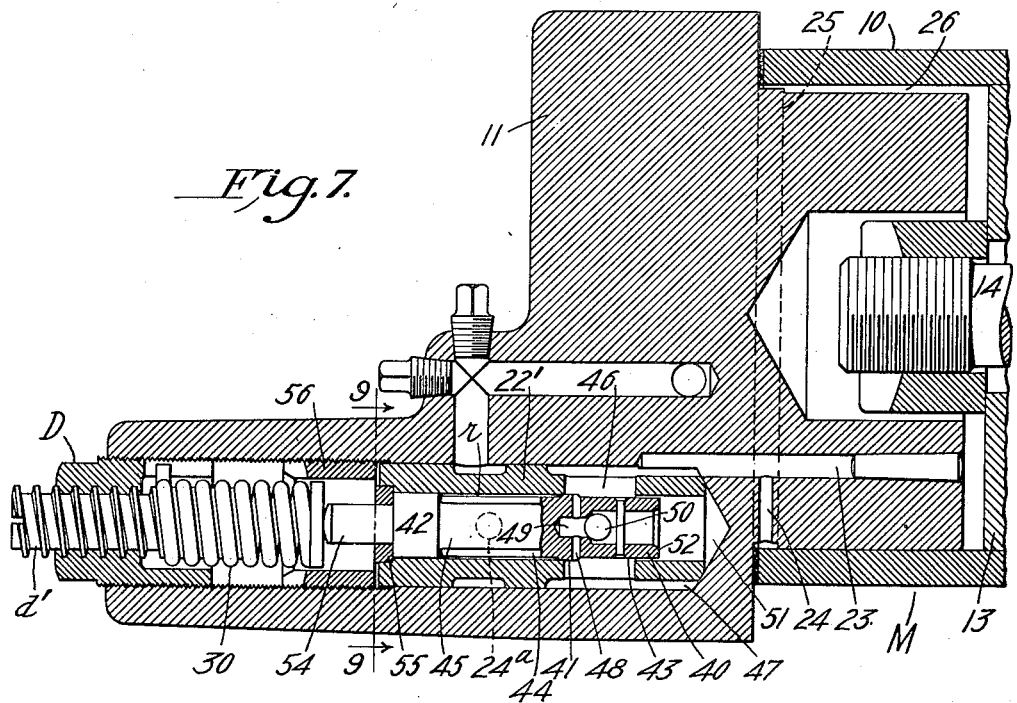
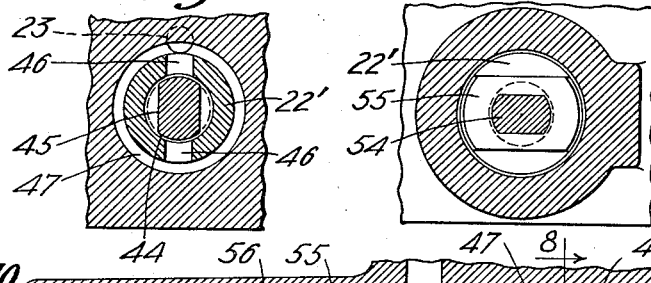
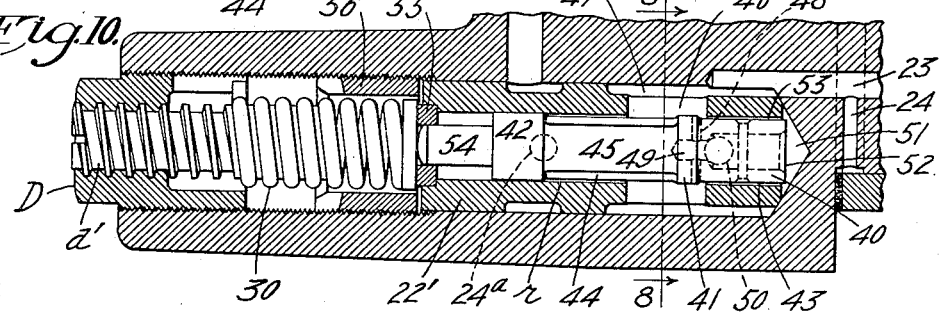

Patented June 25, 1935

2,006,312

UNITED STATES PATENT OFFICE 2,006,312

COMPENSATING BLEEDER VALVE

Hans Ernst and Bernard Sassen, Cincinnati, Ohio, assignors to The Cincinnati Milling Machine Company, Cincinnati, Ohio, a corporation of Ohio Application February 2, 1932, Serial No. 590,336

18 Claims. (Cl. 121—45)

This invention relates to hydraulic motors and is more particularly concerned with means for maintaining the rate of movement of the hydraulic motor unaffected by variations in the leakages of the propelling liquid under varying conditions of pressure and viscosity thereof.

As a general proposition it may be stated that wherever there are contacting parts that move relative to each other such as, for example, a piston and cylinder, under a force of hydraulic pressure or in opposition to a similar force, a leakage of propelling fluid unavoidably occurs between the engaging faces of the relatively movable elements.

Now, should the piston and cylinder, in the above example, be used as a pump the leakage of fluid past the piston thereof decreases the quantity discharged thereby and the pump may be said to "slip", and the slippage, of course, varies with the pressure, increasing when the pressure increases and decreasing when the pressure decreases. But if the piston and cylinder are used as a motor, the leakage of fluid past the piston, results in corresponding variations in the rate of movement of the motor. Thus, the rate will be retarded when the leakage across the piston is from the forward pressure line of the motor to the back pressure line when the motor is moving against a positive resistance and the rate of movement will be advanced when the leakage is from the back pressure line to the forward pressure line as occurs in such cases when the back pressure is greater than the forward pressure, as for example, when the movement of the motor is assisted, or in fact propelled, by a force other than the hydraulic pressure.

In the application of hydraulic motors to machinery as the medium of propelling or effecting relative movement between the tool and the work-piece, rotary and/or translatory, the problems of maintaining a constant, uniform rate of movement between tool and work are greatly increased due to the leakages of fluid occurring primarily across the motor. The indicia on the rate controlling means do not, for the reasons above pointed out, provide with any degree of accuracy, the standard by which the rate of movement of the motor and the parts driven thereby may be determined. Under a given condition of pressure and temperature of the fluid and a given setting of the throttle or other rate controlling device, the resultant rate of movement of the motor may theoretically be readily calculated. Also the leakages for such given conditions may be determined upon and allowance made therefor. However, should the pressure of the fluid vary as by the motor encountering a greater or lesser resistance, the leakage across the motor will also vary, thereby effecting variations in the rate of movement despite the fact that the rate controlling means has been set to effect a predetermined feed rate.

Another difficulty encountered in the practical application of the principles of this invention resides in the fact that the leakages across different motors of a predetermined size or capacity will not be the same under the same conditions of pressure and, therefore, a device that will compensate for the leakage factor of one motor under a given set of conditions will not function properly in another motor which, for all practical purposes, can be considered a counterpart of the first.

The present invention proposes to compensate for these variable inherent or natural leakages by subjecting the system to an artificial leakage, equal in amount, but opposite in its ultimate effect to the natural leakages, and varying therewith under the variable conditions of operation broadly referred to in the foregoing. The invention possesses as outstanding features a simplicity of design and convenience of adaptation and adjustment to various environments which is extraordinary in view of the results produced thereby. The mechanism is small and compact and may be inconspicuously mounted in the end of the motor cylinder on the working side. If full compensation is desired in a motor designed for a two-way feed cycle, such may be accomplished by positioning one of the devices in each end of the cylinder with proper individual initial adjustment.

The invention is particularly advantageous in simultaneously performing a further function not heretofore referred to, but one of considerable importance in hydraulic propulsion motors. For steady dependable operation it has been found necessary to equip hydraulic systems of the nature involved with a vent for eliminating air from the system. The present construction and arrangement is adapted to perform this function in conjunction with its balancing of the leakages. The additional variable factor of liquid leakage through an independent air vent is, therefore, eliminated. All these factors are combined in a unitary valve mechanism so situated and having such means for changing its characteristics as accurately to perform the dual functions of expelling entrained air and ultimate balancing of the liquid leakages.

A further noteworthy characteristic of the system, as thus devised, is its inherent capability of maintaining its compensatory function under variations of viscosity of the operating hydraulic fluid resulting either from using oils of different natural viscosity or from changes of temperature in the same oil. The variation in leakage across a given area of opening is substantially in proportion to the variations in fluidity. As an example then, once a balance has been established in the present system at a given temperature, any change in temperature within the range normally occurring in a device of this nature will result in changes in in-leakages and out-leakages which are equal to each other.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a plan view of an hydraulic motor of the reciprocating type incorporating this invention. Fig. 2 is an elevational view of the piston rod end thereof. Fig. 3 is a longitudinal sectional view illustrating a preferred location of the automatically responsive compensator. Fig. 4 is a sectional view along line 4—4 of Fig. 1 and illustrating certain ones of the fluid conduits and connections. Fig. 5 is an enlarged detail view of the leakage compensating mechanism. Fig. 6 is a diagrammatic view of a representative type of hydraulic system to which this invention is applicable. Fig. 7 is a detail view of an alternative form of variator designed to be extremely sensitive in operation and to give a higher degree of accuracy in leakage compensation. Figs. 8 and 9 are sectional views along lines 8—8 and 9—9 of Figures 10 and 7 respectively. Fig. 10 is a view, partly in section, illustrating the valve plunger in one of its extreme positions.

Referring more particularly to Figs. 1 to 4 inclusive, it will be noted that the hydraulic motor, indicated generally as M, comprises a cylinder 10, cylinder heads 11 and 12, piston and connecting rod 13 and 14 respectively. The piston rod 14 passes through one of the cylinder heads and is adapted to be connected with a table, slide or other element T of a machine tool in a known manner. A suitable stuffing box 15 provides a seal around the rod to prevent leakage at that point.

One form of hydraulic circuit for propelling the motor M at a feed or traverse rate and in opposite directions is illustrated in Fig. 6. In this figure a large volume low pressure pump RT draws fluid from the reservoir R and discharges same into line a and thence to the selector valve V where it may be directed to either end of the motor to actuate same at a rapid traverse rate, or directed back to the reservoir through line b. A relief valve r serves as an emergency relief should the pressure in the line a exceed a predetermined maximum.

A branch conduit c leading from the line a connects with the intake of a low volume high pressure pump B° and keeps it charged with oil. The discharge from the pump B° combines with the discharge from an adjustable variable displacement unit VD of a well known type and the combined discharge passes into the forward pressure line d which leads to the valve V. The valve V is adapted to be manually or automatically actuated and when in the position shown connects the feed line d with lines f and g and the small end of the motor M. The piston 13 is thereby moved to the left, discharging fluid from that end of the motor through lines h, i, valve V, and line j that connects with the intake side of the VD unit. Thus it will be seen that the rate of movement of the motor is determined by the rate at which fluid is permitted to be discharged from the back line. In other words, the setting of the VD unit controls the rate of table feed.

Intermediate the selector valve V and the motor, there is preferably positioned a stop valve S for stopping the movement of the carrier T and which is adapted to be shifted to a position such that fluid to and from the motor is cut off and the discharge from the pumps short-circuited and thus relieved of high pressure stresses. A relief valve k is also provided in the forward line for preventing excessive pressures therein during a feed stroke and for venting unused fluid to the reservoir.

The foregoing will serve to illustrate in a general way, the operation and functioning of that particular system, but if additional data is required as to the details thereof, reference may be had to British Patent #297,104 for a more complete disclosure.

In order that any movement at all be imparted to the table T, the pressure $P_1$ of the fluid in the forward line d must, of course, exceed the pressure $P_2$ of the fluid in the back line j, and, under idling conditions, the pressure difference $P_1-P_2$ approaches a zero value. Nevertheless, there is a difference in pressure such that leakage of fluid from the higher pressure to the lower pressure takes place across the piston, that is between the piston 13 and the walls of the cylinder 10. This leakage, of course, varies as the structural differences in various motors and the apparatus to which they are applied. However, since the fluid passing the piston is discharging into the rate controlling side of the circuit here shown, the effect of the leakage is to increase the quantity of fluid therein and hence retard the rate of movement of the motor and table. The net or ultimate effect may, of course, be somewhat modified by various other types of leakages that may occur elsewhere in a given system or circuit.

When the tool, such as a milling cutter, engages the work-piece and tends to prevent movement of the table, the back pressure decreases proportionately to the value of the work resistance thereby increasing the pressure difference $P_1-P_2$. The increase in pressure difference causes a greater leakage past the piston 13 into the rate controlling line and still further retards the feed rate. As the positive work resistance varies so will the leakage, the resultant effect of which is to vary the feed rate and render the throttle or rate controlling devices unreliable as a feed control.

Occasionally bubbles of air find their way into an hydraulic system and finally become entrained in the motor cylinder, and because of its compressible properties interferes greatly with the smooth operation of a machine tool. To relieve the system of the entrapped air, vent pipes or air drains have heretofore been located at each end of the motor and although they effectively per-formed their intended function, to wit, that of allowing the air to escape, they also provided an additional outlet for the pressure fluid. The leakage of oil through the air drains further retards or advances the feed rate of the motor, according to the type of system employed, and should be compensated for if the rate of movement is to remain constant under varying conditions.

This invention proposes a unitary device for overcoming the disadvantages of the prior hydraulic systems by incorporating into the system a device that functions automatically to maintain a balance between the "out" leakage and the "in" leakage (with respect to the rate controlling side of the circuit) so that the resultant effect upon the feed rate will be inconsequential; and which device in addition serves to expel the entrapped air from the system. With that end in view a variator, such as illustrated in Fig. 5, is embodied in the system, preferably in the cylinder head of the motor, and comprises a shiftable valve element 20 that cooperates with ports 21 formed in a sleeve element 22, to control the flow of fluid from conduits 23, 21ᵃ and 21 to a conduit 24ᵃ.

In the specific example shown in Figs. 1 to 6, the conduit 23 communicates with the interior of the motor cylinder 10 through conduit 24, annular groove 25 and the reduced or relieved portion 26 located at the most elevated portion of the piston head while the conduit 24ᵃ communicates with the reservoir or other source of lower pressure fluid. Air entrained in the cylinder will naturally collect at the high point and be forced through opening 26 and carried through the valve to the reservoir line 24ᵃ with the flow of liquid. Intermediate the ends of the valve piston 20, there is provided a reduced portion 27, one side of which is tapered, as at 28, thereby providing a passageway that progressively increases in every dimension in the direction of the flow of fluid therethrough. Inasmuch as the flow of fluid is from a small area to a larger area in all normal positions of the valve, the tendency of particles of solid matter to stick or collect at the valve orifice clogging the flow is thereby largely eliminated and the life of the valve prolonged because of the reduction in the erosion of the valve seat.

Theoretically the tapered portion 28 of the valve plunger should be parabolic in form in order that the flow past the orifice will be directly proportional to valve movement. However, to facilitate machining problems the taper may be made straight, inasmuch as the error thereby caused is so slight that, in most applications or uses, it is negligible and may be disregarded.

Since it is the pressure difference of the fluid that is the measure of the leakage across the motor and since the pressure difference varies in a fixed relation to the variation in the pressures themselves, it is proposed to regulate the artificial balancing leakage in accordance with the rise and fall of the pressure of the fluid in the back pressure side of the motor in the system here shown. For this purpose fluid is directed into the chamber 29 of the valve and reacts against the face 20ᵃ of the valve piston tending to move the latter in a direction closing the opening 21—28, in opposition to the force exerted by an adjustable spring 30.

The sleeve 22 abuts against a plug 31 and is held in place by means of a locking nut 32. So that pressure fluid may enter the chamber 29 freely, a one way acting check valve 33 is formed in the plug member 31 that establishes the communication with conduit 23 through the cross port 34.

Thus it will be seen that an increase in the back pressure (which will be proportional to the decrease in pressure difference across the motor) effects a shifting of the valve plunger toward its closed position thereby diminishing the artificial drain to the reservoir in proportion to the decrease in the leakage across the motor from the forward pressure line to the back pressure line. On the other hand, should the work resistance increase and thereby increase the pressure difference by reducing the back pressure, the check valve 33 closes and the fluid discharged by the advancing piston 20, under the force of the spring 30, passes around the threads of a loosely fitted screw 35 back into the supply conduit 23. It will be noted that this arrangement somewhat retards the return movement of the valve plunger (toward open position) when the actuating pressure falls, thereby preventing oscillation or fluttering movements of the valve stem.

The foregoing relates primarily to an hydraulic system in which valve adjustment for compensating leakage is effected by means responsive automatically to variations in pressure of the fluid ahead of the piston. Obviously, merely by reversing the direction of the taper 28 and connecting chamber 29 with the forward pressure line, the same mechanism may be made responsive to variations in the pressure behind the piston in systems where such variations occur.

As hereinbefore mentioned the natural leakage of one motor may be greater than another and so that the leakage compensator may be adjusted to suit the leakage factor of any given motor under idling conditions, an adjusting nut D is provided for shifting the valve plunger 20 with respect to the holes in the sleeve 22 in order that the total "out" leakage, to wit, through the variator, from the back pressure line to the reservoir, and from other portions of the systems may be made to equal the "in" leakage, or in other words, to effect a balancing of the total leakages under a given condition of pressure. After the adjustment is once made, any variation in the pressure condition effects a variation in the natural leakage and likewise a corresponding variation in the size of the artificial leakage orifice (21—28) whereby a balance of the leakages is maintained.

Under certain pressure conditions existing in a motor it may be desirable that the compensator valve be made to function differently, that is, to provide an increased or decreased amount of leakage for a unit decrease or increase of pressure and so that the variator may be adaptable to such conditions, an adjusting screw $d'$ is provided. Fig. 5 illustrates clearly how adscrew $d'$. The screw $d'$ likewise has a threaded justments of this character may be made, and in about the grooves formed by the threads of the screw $d'$. The screw $d_1$ likewise has a threaded engagement with the nut D so that turning of the adjusting screw varies the number of active or live coils remaining in the spring, and as a result thereof, varies the value of the pressure required to shift the valve plunger 20 as a unit distance. In this way a greater or lesser degree of valve opening may be effected for any given variation in the actuating pressure.

Fig. 7 depicts an alternative form of valve in which the essential advantages resulting are that in place of the flow curve being in the form of a parabola as occurs when the tapered valve stem shown in Fig. 5 is used, the flow is directly proportionate to the valve movement, thus producing greater accuracy in leakage compensation for unit variations in pressure.

In this particular form of valve the plunger 40 thereof is provided with two raised portions 41 and 42 that are slidingly fitted to the bore of the sleeve member 22'. One end of the plunger is provided with a slightly relieved or reduced portion 43, and intermediate the raised portions there is a second slightly relieved or reduced portion 44 the sides of which are further reduced as indicated at 45 (Fig. 8) to provide channels or passageways later to be referred to.

In the sleeve member 22', and spaced approximately 90° from the flats 45, there is provided a radially arranged slot or elongated passageway 46 which communicates with an annular groove 47 and thence with the conduit 23, previously mentioned in connection with Fig. 5, and the upper interior of the cylinder 10.

In operation the valve functions as follows: Assuming that there is little or no pressure within the cylinder 10, the valve plunger 40 will be shifted, under the force of the spring 30, to its fully opened position (Fig. 10) whereby fluid from the cylinder 10 is permitted to pass through channels 23 and 47, opening 46, through the narrow but relatively long space r existing between the surface 45 of the valve plunger and the walls of the bore in the sleeve member 22', and adjacent the opening 46, to the relatively large passageways provided by the flats 45 and the bore of the sleeve. These passageways communicate with the channels and conduits indicated generally as 24ª and thus the fluid is conveyed to the reservoir R.

When the machine is started, however, the pressure in the motor cylinder immediately rises and a portion of the liquid passes from the opening 46, into radial ports 48 formed in the valve plunger, to chamber 49. Check valve 50 is then opened allowing fluid to pass into the chamber 51 and thus by reacting against the end 52 of the plunger, moves the latter toward the closed position in opposition to the spring 30. Since the portion 43 of the plunger is smaller in diameter than the bore in the sleeve, pressure fluid also passes through the opening 53 into the chamber 51, hence it will be seen that the movement of the valve toward the closed position takes place at a relatively rapid rate. The contrary is true when the pressure drops and the valve is moving toward its open position. Under these conditions the check valve 50 is closed and the fluid in the chamber 51 must pass via the narrow passageway 53 back to the motor. In this way the governing of the movements of valve plunger 40 are obtained for the same purposes that have been heretofore explained in connection with Fig. 5.

As the position of the valve plunger changes the greater or less will be the longitudinal extent of opening at r, which allows a flow from 46 to 45 to take place, and the less or greater will be the total resistance to such flow. It will be understood, of course, and by referring to the sectional view, Fig. 8, it is apparent, that the circumferential length of the relieved portion 44 underlying the slot 46 is slightly greater than the peripheral extent of the said slot along the circumference of the bore in the sleeve 22, whereby the circumferential passageway for the fluid about the valve plunger from 46 to 45, is comparatively short. In some cases the space between the wall of the bore and the periphery of the reduced portion of the valve may be .006 of an inch, for example, and since this value remains constant for each unit of length of the reduced portion, the conductance of the valve or the amount of fluid permitted to pass therethrough likewise is constant under a given pressure condition for each unit of length of the reduced portion that is exposed to the incoming fluid. Hence the capacity or the flow through the valve when same is opened is equaled to the sum of the conductance of the individual units of length of the relieved portion that underlies the opening 46.

As here shown the valve is connected in a manner such that unit movements of the valve plunger are effected by unit changes in the pressure and thus it will be seen, that for each unit movement of the plunger, the conductance to flow through the valve is varied in direct proportion and thus the flow therethrough is maintained at all times in proper balance to the amount of leakages required. Extreme accuracy in compensation is thereby attained and with a higher degree of sensitiveness under various operating conditions. When the valve is fully closed the enlarged portion 41 of the plunger closes off the communicating passage r between ports 46 and channels 45 thereby discontinuing all flow to the reservoir.

In order to maintain the relieved portions 44 of the valve plunger directly opposite the opening 46 in all longitudinal positions of the plunger, the plunger 40 is provided with suitable means such as the squared portion 54 which passes through a complemental opening formed in a member 55. The member 55 is seated in a recess provided at the end of the valve sleeve 22' and both parts are held against rotary or axial movement by means of the clamp bushing 56.

The variator shown in Figs. 7 to 10, occupies the same position with respect to the motor as does the variator shown in Figs. 1 to 6, that is, preferably in the cylinder heads of the motors, and when so located functions also as an air bleeder for permitting entrained gases to escape from the system. Obviously, this valve may also be adjusted to operate under various conditions and may be made responsive to changes in the forward pressure, in such systems where it occurs, or to changes in other pressures or pressure differentials, so as to render the valve adaptable to control the artificial balancing leakage and/or to remove the gases entrained in any given system.

For a two-way cycle motor a compensating valve is, of course, provided in each cylinder head. Fig. 3 illustrates the structural arrangement of a motor adapted to be fed in opposite directions while Fig. 6 illustrates diagrammatically the fluid connections of a representative type of hydraulic circuit therefor. While a differential type of motor has been illustrated it is obvious that this invention is also applicable to a non-differential motor. However, with a differential motor, having a two-way feed cycle, the presence of the piston rod in one side of the system produces an unbalanced condition of the pressures in pounds per square inch, that exists in the cylinder in opposite sides of the piston. For example, when feeding to the left in Fig. 6 the pounds pressure per square inch acting upon the smaller effective area of the piston required to move the support T against a given resistance may be 900 lbs., while the pressure per square inch acting upon the larger effective area of the piston required for feeding the support to the right against the same resistance may be only 800 lbs.

It will be seen, therefore, that although the support T may be moved in opposite directions against a given work resistance, or even under idling conditions, the leakages across the motor will also vary according to the direction of movement of the motor, and which may readily be compensated for by manipulating the adjusting screws $d'$ and $D$ so that the compensators at the respective ends of the motor cylinder will function to effect a balancing of the leakages irrespective of whether the feed is to the left or to the right.

It will also be noted that accurate compensation is maintained even though the fluidity of the oil changes and a greater or less volume of fluid passes the crevices surrounding the piston. If the oil is relatively cold very little natural leakage at the piston will occur under a given condition of pressure. So likewise at the orifice in the compensator valve, if the oil is cold, very little will pass through the restricted opening 21—28 in Fig. 5, or the resistance $r$ in Figs. 7 to 10. A gradual heating up of the oil, without change in pressure, effects both types of leakages alike, and so if the valves are adjusted to balance the leakages at a given temperature, the balance will be maintained at other temperatures as well.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:—

1. An hydraulic propulsion system including a motor and a rate control line therefor; and a combined air bleeder and leakage compensator for said motor comprising a variable opening valve means in liquid communication with said rate control line and adapted to bleed entrained air therefrom and to produce an artificial leakage of liquid substantially equal to but opposite in effect to the normal natural leakage from said line, and means in liquid communication with said rate control line for varying the opening of said valve means in accordance with variations in pressure in said rate control line whereby the artificial leakages from said line are maintained equal to the net natural leakages into said line and a balance is maintained.

2. An hydraulic propulsion system including a motor and a rate control line therefor; and a unitary mechanism for removing entrained air from the system and compensating for net natural leakages into said rate control line comprising a variable opening valve means in liquid communication with a point in said line adapted to collect any entrained air and through said communication to bleed said air and produce an artificial leakage of liquid out of said line, and means responsive to variations in pressure in said rate control line to vary the opening of said valve means and to thereby maintain a balance between the net natural leakages and the artificial leakages.

3. An hydraulic motor including piston means normally subject to variable leakages across said piston means in accordance with variations in pressure in said motor; and a device for compensating for said leakages and for bleeding entrapped air from the hydraulic fluid comprising bleeder valve means communicating with a point in said motor on the side to which said leakages across said piston occur and adapted to collect entrained air, and means responsive to variations in pressure in the said side of the said motor for varying the opening of said valve means and thereby maintaining a balance of leakages on said side.

4. An hydraulic motor including piston means; a back pressure control line for regulating the movement of said piston means said control line being subject to net natural leakages thereinto variable in accordance with the varying working pressures in said motor; and a combined means for compensating for said leakages and for expelling entrained air in the hydraulic fluid comprising a bleeder valve means connected to a point in said back line adapted to collect entrained air, and means for varying the opening of said valve means in accordance with variations in pressure in said back line and to thereby maintain a balance between the liquid leakages in and the liquid leakages out of said back line in addition to expelling the entrained air.

5. A device for counteracting the effects of leakage across the piston of a piston and cylinder mechanism combining, a valve mechanism having an adjustable valve element therein; fluid connections between said valve mechanism and said cylinder and between said valve mechanism and another source of fluid, the said connection with said cylinder being at the highest point thereof reached by the fluid therein; and means responsive to variations in the pressure of the fluid in one of said connections to adjust the position of said valve element thereby to regulate the flow of compensating fluid and entrapped gases through said valve.

6. A mechanism for extracting entrapped gases and for compensating for the effects of leakage in an hydraulic motor subjected to variable loads and in which the natural leakage of fluid therein produces variations in the rate of movement of the motor combining, a valve means carried by the cylinder head of said motor communicating with a source of fluid pressure and said motor for providing a flow of compensating fluid to balance the natural leakages and concurrently therewith to remove entrapped gases; and means responsive to variations in the pressure in said motor for varying the effectiveness of said valve means.

7. An hydraulic system combining a forward pressure line and a back pressure line; an hydraulic motor of the piston and cylinder type connected with said lines and in which there is a tendency for entrained gases to collect and in which there is a natural leakage of fluid from one side of said piston to the other side tending to vary the rate of movement of the motor; and means including an escapement device for providing for an artificial balancing leakage of a magnitude substantially equal to the natural leakage but opposite in its effect upon the rate of movement of said motor and concurrently therewith an exit for collected gases.

8. An hydraulic system combining a leaky motor of the piston and cylinder type; conduits connected with said motor for conveying fluid thereto and therefrom; means for varying the rate of flow through one of said conduits thereby to vary the rate of movement of said motor; leakage compensating means for said motor comprising a valve mechanism carried by the said cylinder and communicating with the interior thereof; and means automatically responsive to variations in the fluid pressure in the conduit adapted to convey fluid from the said motor for controlling the effectiveness of said leakage compensating means.

9. An hydraulic system combining a motor normally subject to natural leakages of the hydraulic fluid affecting its rate of operation; fluid conduits connected with said motor; mechanism for controlling the flow of fluid through one of said conduits thereby to vary the rate of movement of said motor; means supported by the cylinder of said motor and communicating with the interior thereof for counteracting the effects of natural motor leakages on the rate of movement thereof; and means automatically responsive to variations in one of the factors causing motor leakage to vary the action of said counteracting means.

10. In an hydraulic motor of the piston type in which the natural leakage of liquid past the piston effects variations in the rate of movement thereof, the combination of means for counteracting the effects of the natural leakages and for removing entrained gases from the motor comprising a bleeder valve mechanism carried by the cylinder head of the motor and in communication with the interior thereof for producing an artificial leakage in said motor substantially equal to the natural leakages but opposite in its effect on the rate of movement, said bleeder valve mechanism having an adjustable orifice for the passage of liquid and entrained gases.

11. A mechanism for compensating for leakages normally occurring in an hydraulic motor thereby to maintain a predetermined rate of movement thereof irrespective of variations in the difference in pressure values across the motor combining, a variable orifice valve means embodied in said motor in liquid communication with the fluid in said motor and adapted to control a flow of compensating fluid therethrough to balance the effect of the normal leakages; and means for varying the effectiveness of said valve means in accordance with variations in the difference in the pressure values across the motor.

12. A device for compensating for leakages normally occurring in an hydraulic motor of the piston and cylinder type, combining a valve mechanism carried by said motor and communicating with the interior thereof for causing an artificial leakage to occur to balance the effect of the normal leakage; and means responsive to variations in the fluid pressure acting upon one side of the piston of said motor to vary the action of said valve mechanism.

13. An hydraulic motor of the differential piston type normally subject to natural leakages combining, valve means located adjacent each end of the motor for effecting an artificial leakage to counteract the effects of the natural leakages, each of said valve means being adjustable to suit the leakage characteristics of the motor when the latter is propelled in opposite directions and responsive to changes in pressure values occurring in the respective sides of the said motor to vary the artificial leakage.

14. A mechanism for compensating for the effects of leakages in an hydraulic motor subjected to variable loads combining a valve means embodied in said motor comprising a casing member provided with an inlet and port communicating with the interior of said motor and an outlet port, a valve element in said casing movable relative to one of said ports and arranged as to control the flow of fluid between said ports; and means provided by said valve element to maintain the value of the flow between said ports directly proportionate to the amount of movement between said element and said port; and means responsive to variations in the pressure of the fluid in the outgoing side of said motor for adjusting the relative position of said valve element.

15. An hydraulic propulsion system having a motor of the piston and cylinder type in which the rate of movement thereof is controlled by volumetrically regulating the discharge from said motor and in which the leakage of fluid past the piston into the discharge side of the motor effects a variation in the rate of movement of the motor combining means for counteracting the effects of motor leakage and for removing entrained gases from the system comprising a valve mechanism embodied in said motor having an adjustable orifice, a fluid connection between said valve and the interior of said motor, means responsive to the pressure existing in the discharge side of said motor for actuating said valve mechanism to a position whereby the fluid passing said valve under idling conditions of the motor substantially balances the natural leakage of fluid past the piston of the motor; and means automatically imposing secondary adjustments on said valve to maintain said balance of leakages under working conditions of said motor.

16. A device for compensating for the effects of natural leakage of fluid into the rate control line of an hydraulic motor and concurrently removing from said motor such gases as may be entrapped therein comprising valve means communicating with the interior of said motor at the highest point thereof reached by the fluid column; and fluid actuated means responsive to variations in pressure of the fluid in said rate control line for actuating said valve means to a position adapted to effect an out-leakage of fluid from said motor equal in amount to the in-leakage in said line and to provide an exit for entrapped gases.

17. A unitary device for compensating for the effects of natural leakage of fluid into the rate control side of an hydraulic motor and concurrently removing therefrom such gases as may be entrapped therein comprising valve means communicating with the interior of said motor at the highest point reached by the fluid column; fluid actuated means responsive to variations in pressure of the fluid in said rate control side for actuating said valve means to a position adapted to effect an out-leakage of fluid from said motor equal in amount to the in-leakage in said side; and means adjustable to vary the effect of a unit change in said pressure upon the positioning of said valve means thereby to render said valve means amenable to motors having different leakage values.

18. A reversible hydraulic motor of the differential piston type normally subject to natural leakages which vary in accordance with variations in the pressure difference across the piston combining, valve means embodied in said motor on each side of the piston thereof alternately effective to provide an artificial leakage to counteract the effects of the natural leakage, one of said valves being adjusted under a given condition of pressure to suit the leakage factor of the motor when the latter is propelled in one direction and another of said valves being adjusted under a given condition of pressure to suit the leakage factor of the motor when the latter is propelled in a reverse direction, and means automatically responsive to a variation from said given conditions of pressure for imposing secondary adjustments upon the respective valves to vary the artificial leakage thereby to maintain the algebraic sum of the natural and artificial leakages equal to zero in either direction of movement of said motor irrespective of changes in the pressure difference across the piston.

HANS ERNST.
BERNARD SASSEN.